Aug. 20, 1929. P. UHLICH 1,725,431.
MACHINE FOR THE MANUFACTURE OF THE CURVED TEETH OF BEVEL WHEELS
Filed Nov. 27, 1925 9 Sheets-Sheet 1

Inventor:
Paul Uhlich.

By William E. Linton.
Attorney.

Inventor:
Paul Uhlich.
By William C. Linton.
Attorney.

Aug. 20, 1929.  P. UHLICH  1,725,431
MACHINE FOR THE MANUFACTURE OF THE CURVED TEETH OF BEVEL WHEELS
Filed Nov. 27, 1925  9 Sheets-Sheet 3

Inventor:
Paul Uhlich.
By William C. Linton
Attorney.

Aug. 20, 1929.  P. UHLICH  1,725,431

MACHINE FOR THE MANUFACTURE OF THE CURVED TEETH OF BEVEL WHEELS

Filed Nov. 27, 1925  9 Sheets-Sheet 4

Inventor:
Paul Uhlich.
By William C. Linton.
Attorney.

Inventor:
Paul Uhlich.
By William C. Linton.
Attorney.

Aug. 20, 1929. P. UHLICH 1,725,431
MACHINE FOR THE MANUFACTURE OF THE CURVED TEETH OF BEVEL WHEELS
Filed Nov. 27, 1925 9 Sheets-Sheet 8

Inventor:
Paul Uhlich.

By William C. Linton.
attorney.

Aug. 20, 1929.    P. UHLICH    1,725,431
MACHINE FOR THE MANUFACTURE OF THE CURVED TEETH OF BEVEL WHEELS
Filed Nov. 27, 1925    9 Sheets-Sheet 9

Inventor:
Paul Uhlich.
By William C. Linton.
Attorney.

Patented Aug. 20, 1929.

1,725,431

UNITED STATES PATENT OFFICE.

PAUL UHLICH, OF BERLIN-WEISSENSEE, GERMANY, ASSIGNOR TO GLEASON WORKS, OF ROCHESTER, NEW YORK.

MACHINE FOR THE MANUFACTURE OF THE CURVED TEETH OF BEVEL WHEELS.

Application filed November 27, 1925, Serial No. 71,733, and in Germany August 5, 1924.

This invention relates to a machine for the production of toothed wheels with teeth curved in their longitudinal direction.

In the machines well known in the art for producing curved teeth either a planing cutter working with circular rocking movements, or a rotating milling head are employed. It is impossible with such machines to shape in one operation the two faces of a tooth of equal radius due to the fact that the rotating milling head forms a tooth having an internal diameter which is larger than its external diameter. Consequently, circular operations covering relative spaced centers were used for the opposite faces of the teeth in such a manner that the faces of the teeth of two wheels working together in pairs have the same curvature in order to obtain better contact. According to another suggestion, first all of the left faces and all of the right faces are milled with differently shaped milling tools in several separately executed working operations. In the first mentioned method, two entirely different tools are necessary for a pair of meshing wheels. The second suggestion of milling all left faces with one milling tool and consequently all right faces with another milling tool would result in uneconomical working since it requires several working operations.

The method of the present invention is not a milling operation with a rotating tool, but a planing operation employing a pair of rocking tools which rock about separate centers and move together with the wheel to produce a generating movement.

In order to make the invention more clearly understood several forms of construction of a machine according to the invention for cutting the teeth of bevel wheels are illustrated in the accompanying drawings wherein.

The radii 7 and 8, in the plane of the pitch line G—G, are equal, consequently all the tooth faces of the crown wheel, formed by the cutting edges, are curved with the same radius in said pitch plane and contact, during running, over the entire length of the tooth. From Fig. 1 may be seen, moreover that the tooth spaces as well as the tooth cross-sections in the pitch plane are of circular crescent shape. The point 9 of this circular crescent may be situated—according to the desired obliquity of the tooth and the size of the rocking radius—either at the centre of the crown wheel or displaced therefrom. The rocking centres 5 and 6 are displaced through half a pitch on a circle 10, consequently the tooth spaces and tooth cross-sections form congruent surfaces in the pitch plane of the crown wheel.

If the circle for the rocking centres of the cutters is infinitely large, it becomes rectilinear and the generating crown wheel becomes a rack with curved teeth. Such racks may be meshed with pinions of equal pitch, but with any number of teeth. If two or more rocking cutting tools are so arranged that each tool rocks about a centre point which is displaced from the centre of the other by half a pitch, or a multiple thereof, on a rectilinear line, it is then possible to machine the right and left faces of a spur wheel simultaneously with corresponding radii, so that even spur wheels with curved teeth can be produced which will work together.

Obviously the pair of tools 3 and 4 may consist of two grinding segments for grinding the tooth faces.

The advantage of this machine resides in that two or more tooth faces on spur wheels, bevel wheels and also racks may be machined in one operation with one and the same radius, whereby the cross sections of the teeth spaces and teeth cross-sections produced are congruent surfaces in the plane of the pitch line of the rack or of the crown wheel, so that the teeth contact over their entire length one with the other on account of the entirely uniform tooth cross-sections of meshing wheels, more favourable strength conditions are obtained than with curved teeth produced by means of milling heads. Moreover a further economical advantage resides in that,—in contradistinction to the hitherto employed rotating milling heads for making curved teeth which are expensive and difficult to keep in order,—according to the invention simple curved cutting tools are employed, each of which is easily re-ground on its front face.

Figure 4:
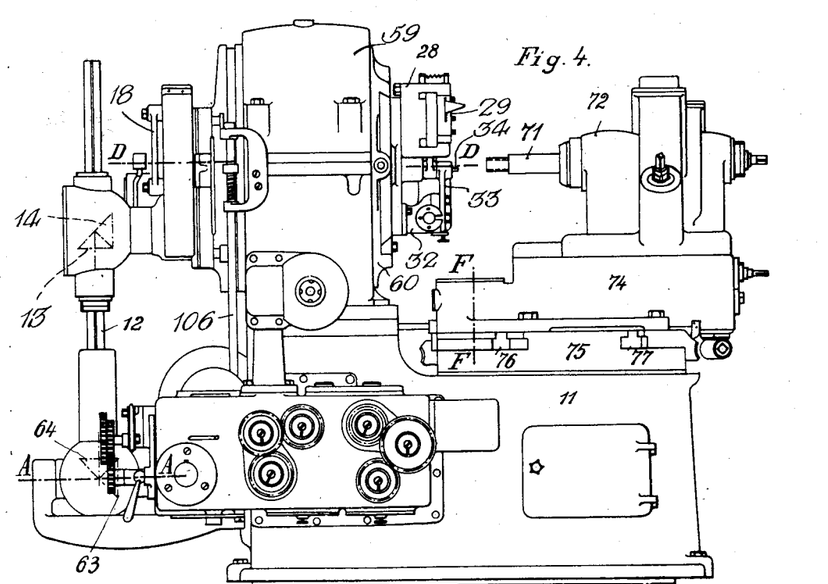
Figure 4 illustrates the machine in side elevation.
Figure 5:
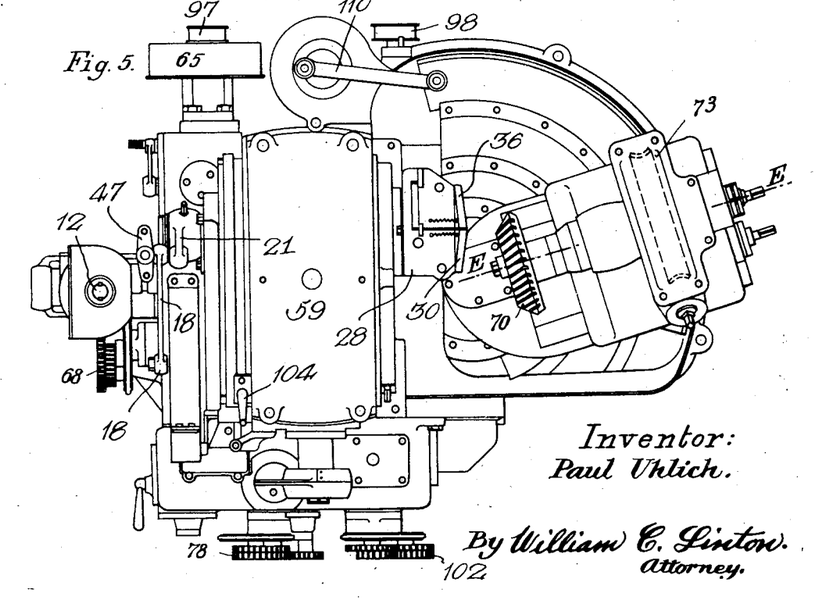
Figure 5 is a plan view.

The vertical shaft 12 (Figs. 4 and 5) is movably mounted in the machine frame 11 around the axis A—A and drives, by means of bevel wheels 13 and 14 (Fig. 6) the horizontal shaft 15 which carries a spur wheel 16, the latter meshing with the spur wheel 17 (Fig. 8), which forms a crank disc. A pitman 18 is slidably mounted in a slot 19 in the spur wheel 17 and adapted to be clamped in position by means of a bolt 20. The other end of the pitman 18 is connected to a crank 21, mounted on a sleeve 22 which is connected with a shaft 23 by means of a groove and tongue. The crank 21 is adapted to be rotated by means of a worm 24 (Figs. 8 and 9) engaging in worm wheel teeth provided on the sleeve 22, so that the shaft 23 may be turned through any desired angle at the centre relatively to the crank 21. The screws 25 serve to clamp the crank 21 to the sleeve 22 or the shaft 23.

Figures 1, 2:
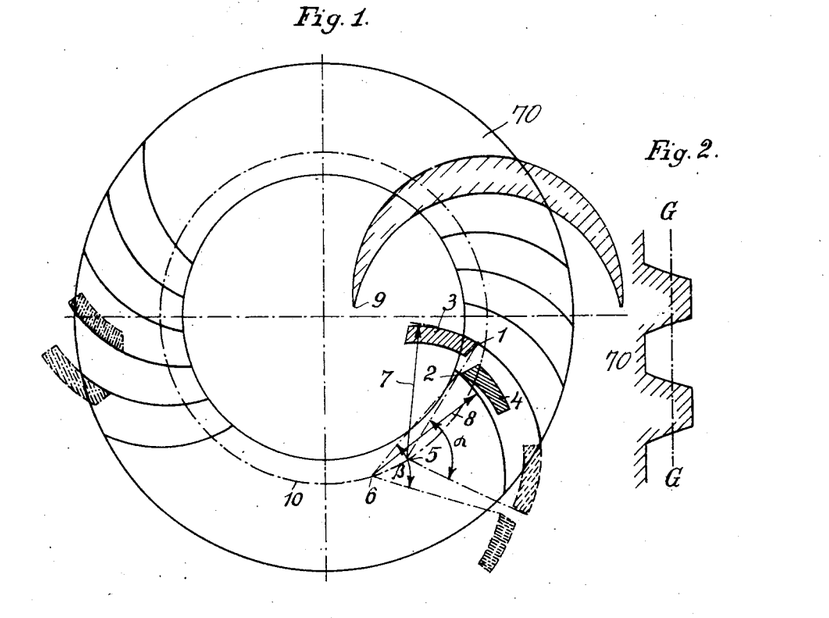
Figure 1 illustrates diagrammatically the steps in the production of a bevel wheel according to the principle of my invention.
Fig. 2 shows a development of the crown wheel formed by the cutting edges of the tool.
Figure 3:
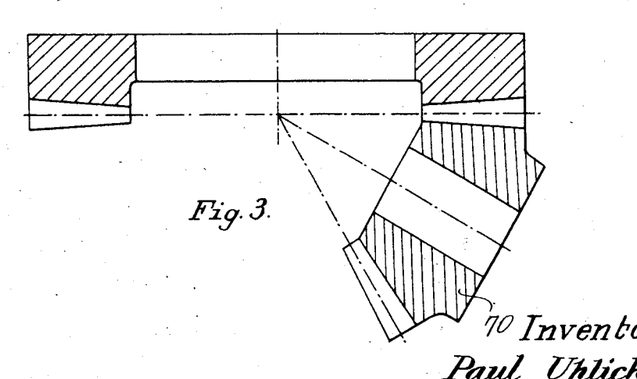
Fig. 3 shows the meshing of the ideal crown wheel with the bevel wheel to be produced.
Figure 11:
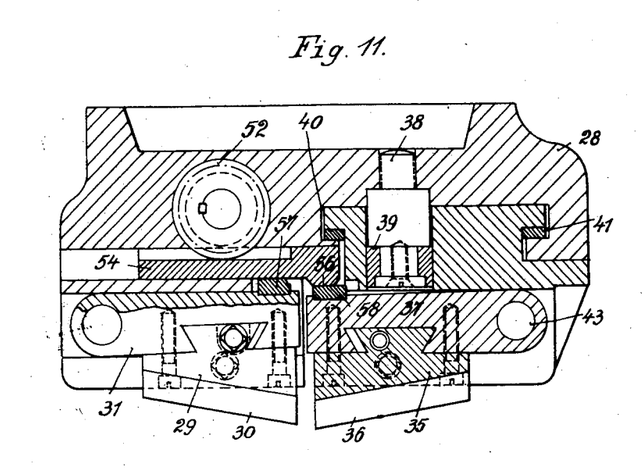
Figure 11 is a sectional view through the head and its associate parts.

The shaft 23 is provided at its other end with a head (Fig. 6) and has, in addition to its bearing 26, an annular guide 27 for the better support of the head 28 which serves as tool carrier. The head 28 carries the tool holder 29 (Fig. 7) which carries the cutting tool 30 proper. The cutting tool may for example, be in the form of a section of a ring-shaped member and is in this case supported upon an inclined surface on the tool holder 29 (see Fig. 11). This inclined position is necessary as a cutting angle is to be obtained such that only the foremost cutting edge of the tool contacts with the work, as shown in Fig. 11. The tool holder 29 is not screwed solid with the head 28, but may oscillate with its support 31 about the axis B—B (Fig. 7), so that the cutting tool 30 may be advanced prior to the cutting movement and withdrawn prior to the return movement. The cutting tool 30 (Fig. 11) corresponds with the tool 3 (Fig. 1).

Figure 6:
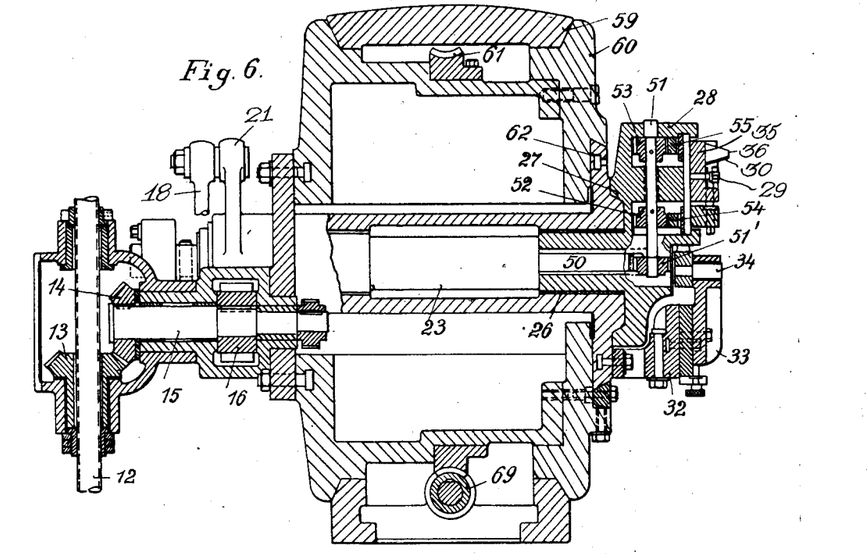
Figure 6 is a vertical sectional view on line 6—6 of Figure 9.
Figure 7:
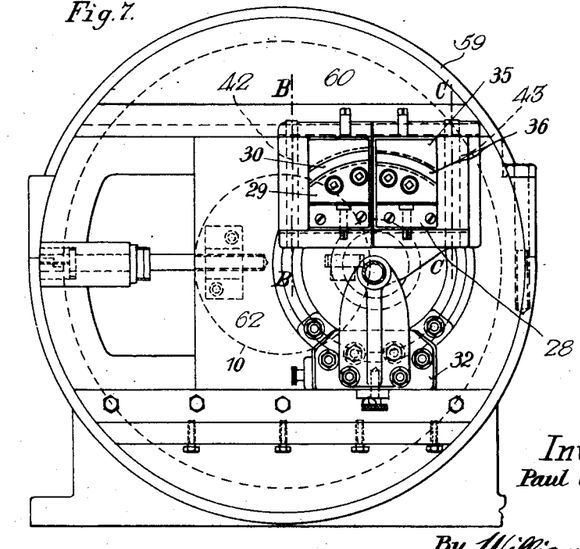
Figure 7 is an end elevation.
Figure 10:
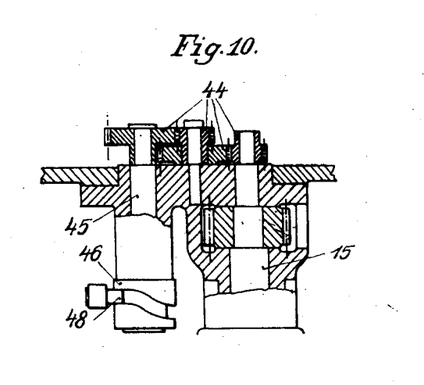
Figure 10 is a perspective view of the tool lifting cam.

On a base plate 32 rigidly mounted opposite the head 28 (Fig. 6) is a bracket 33, carrying a pivot 34, about which the second tool holder 35 (Fig. 7) oscillates. The tool holder 35 carries a cutting tool 36 which is likewise a section of a ring-shaped member and is adapted to oscillate around the axis C—C (Fig. 7) so that the cutting tool 36 may be advanced prior to the cutting movement and withdrawn prior to the return movement. The bracket 33 for the pivot may be adjusted on the base plate 32 in order to vary the distance of the pivot 34 from the centre of the shaft 23. The tool holder 35, together with its support 37 (Fig. 11) is guided on the head 28 and is rocked by the bolt 38 and the guide member 39 during the rocking movement of the shaft 23 and its head. The guiding of the tool holder base 37 in the head 28 is, however, arranged with free play laterally at 40 and 41, in order to enable the tool holder to take part in the oscillations about the pivot which is eccentrically situated relatively to the shaft 23. Fig. 11 illustrates how the tool holders 29 and 35 are oscillatably mounted on the pivots 42 and 43 respectively, in order to effect a withdrawal movement for lifting the cutting tool during the idle stroke. In Fig. 11 is shown the tool holder 35 in working position, whereas the tool holder 29 is in its withdrawn position. The lifting of the cutting tool is effected by the shaft 15 (Fig. 6) which by means of the wheels 44 (Fig. 10) rotates a shaft 45 carrying a cam groove 46, into which the pin 48 on a lever 47 engages and thereby reciprocates a rod 50 by means of a sleeve 49. The rod 50 is provided at its end with a rack (Fig. 6) engaging a pinion 51′ mounted on a shaft 51 and subjecting them to rocking movements during its reciprocation. Mounted on the shaft 51 are two other pinions 52 and 53 meshing with the racks 54 and 55 (Figs. 6 and 11). Each of said racks has a cam projection 56 acting on plates 57 and 58. The plate 57 is mounted on the tool holder base 31, the plate 58 on the tool holder base 37. The lifting of the tools during the idle stroke may be omitted, when employing the grinding segments mentioned above instead of the cutting tools.

By having the pair of tool carriers mounted so that one will be solely supported by the head to swing therewith and the other connected with the head but supported by the pivot 34, it will be seen that in the oscillation of the head and arcuate movements of the drum 60 the cutters or tools 30 and 36 will follow each other in two eccentric paths of travel.

As carrier for the driving gear and the tool head a bearing 59 (Fig. 6) is provided, in which a drum 60 is journalled. The rotation is effected by means of a worm wheel 61. Radially displaceable on the drum 60 is arranged a slide 62, on to which is screwed the base plate 32. The displacement of the slide 62 is necessary to vary the radius of the circle 10 (Figs. 1 and 7) in accordance with the size of the bevel wheel to be produced. This circle 10 is the path for the centres of rotation of the pair of tools. The rocking centre 5 of the left cutting tool and the rocking centre 6 of the right cutting tool are displaced from each other upon the circle 10 by half a pitch. The slide 62 is rigidly screwed to the drum 60 during working. The shaft 12 is driven from the pulley 65 (Fig. 5) by means of the bevel wheels 63 and 64, thereby subjecting the head 28 with the pair of tools 30 and 36 to a rocking movement; the pulley 65 transmits, moreover, a rotary movement by means of a suitably mounted gear and the worm 69 (Fig. 6) to the worm wheel 61. Not only does the pair of tools execute oscillatory cutting movements but the relative respective centers of oscillations are subjected to a slow movement around the axis D—D of the drum 60 (Fig. 4) i. e. along the path of the circle 10. This latter rotary movement takes place in positive accord with the rotation of the bevel wheel 70 to be cut. This bevel wheel is secured in arbor 71 which is rotatably mounted in the head stock 72 and receives its rotation from the worm wheel 73. The head stock 72 is adapted to be displaced on its support 74 by hand along its axis E—E in order to bring the apex of the bevel wheel 70 over the axis of rotation F—F of the plate 75 carrying the support 74. The plate 75 is provided with circular slots 76 and 77 arranged concentrically with the axis F—F and serving for securing the support 74. The support together with the head stock can be so adjusted in said slots that the bevel wheel 70 is situated with one side of its cone parallel to the rocking plane of the tools 30 and 36. The head stock 72 must be set more or less obliquely according to the angle of the pitch cone of the wheel 70.

Figure 24:
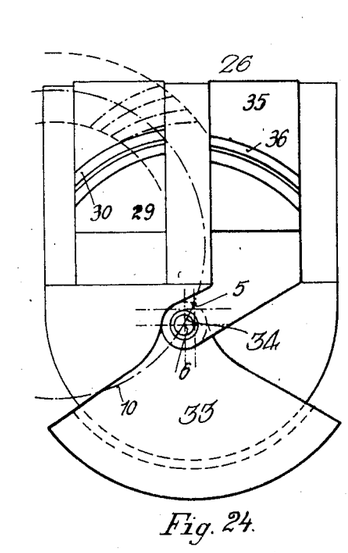
Figures 24 and 25 illustrate one position of the cutter.
Figure 25:
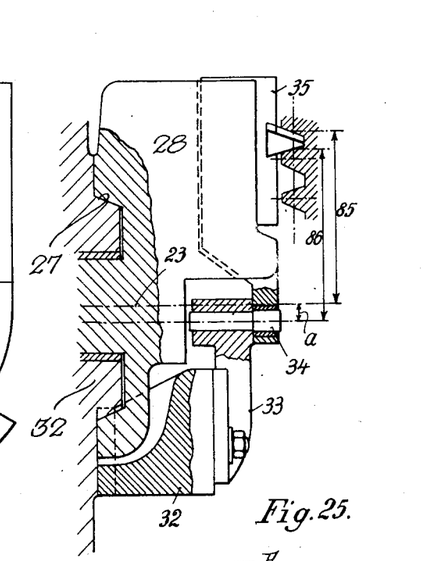

The adjustment of the two cutting tools 30 and 36 is effected in such a manner that the distance $a$ between their centres of rotation, i. e. the distance of the centre of the shaft 23 from the centre of the pivot 34 (Figs. 24 and 25), corresponds to half a pitch on the circle 10. The distance 85 of the cutting tool 30 from the centre of rotation 5 corresponds with the distance 86 of the cutting tool 36 from the centre of rotation 6 in the pitch plane.

Whilst the tool holder 35 with the cutting tool 36 rocks about the stationary pivot 34, the tool holder 29 with the cutting tool 30 rocks about the axis of the shaft 23.

Figure 16:
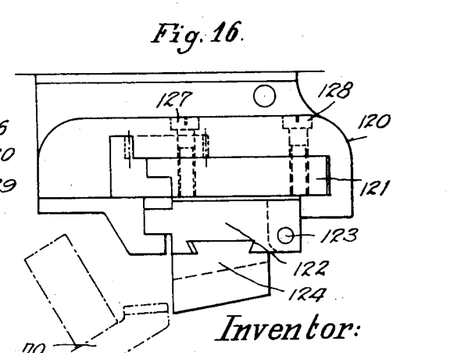

Figures 13 to 16 illustrate a construction of the tool head according to which both tools are arranged at the same side, that is to say, at the right hand side. This construction serves the purpose of cutting wheels, the shaft of which projects through the apex of the cone as shown at 70 in Figure 16. With a one sided arrangement of both cutting tools both tools cut simultaneously during the forward stroke and have a common return idle stroke. The shaft 23 in Figure 6 in this particular case is provided with a head 120 as illustrated in Figure 16 which head is adapted to swing about the shaft 23. The head 120 carries a plate 121 on which a tool holder plate 122 is swingable about a bolt 123. Connected to the plate 122 is the tool holder 124 with the tool 125. The latter is fixed to the holder 124 by binding screws 126. The plate 121 is rigidly fixed to the head 120 by screws 127 and 128. Underneath the plate 121 the head 120 carries a second plate 129 which, however, is not firmly screwed to the head 120 but has lateral play at 130 and 131. The plate 129 is provided with an eye 133 which swings about the bolt 134. The bolt 134 is arranged in a bearing 135 which in turn is arranged at the base plate 136. The base plate 136 is by means of screws fixed in an annular groove 137 and is therefore fixed relatively to the head 120 to the slide 62 (Fig. 6). The base plate 136 corresponds to the base plate 32 shown in Fig. 6. Mounted on the plate 129 is a tool holder plate 138 on which, in turn, is mounted a tool holder 139 with the tool 140. The plate 121 is moved directly by the head 120 and therefore swings about the center of shaft 23 whereas the tool 140 swings about the center of the bolt 134. During the cutting stroke of the tools both tool holder plates 122 and 138 are simultaneously pressed forward for which purpose a rod 141 is provided which displaces the slide 142. Noses or projections 143 at the slide 142 engage ledges 144 provided at the tool holder plates 122 and 138. During the return stroke of the tools the projections 143 enter between the ledges 144 so that the tool holder plates may be returned by tension springs 145. The tool holder plate 138 swinging about the bolt 140 is shifted from the head 120 by means of the bolt 146 engaging with a block 147 the slot 148 of the plate 129.

This construction offers a very simple means for cutting the teeth of bevel wheels the shaft of which projects as shown in Figs. 15 and 21–23 beyond the apex of the wheel cone and which teeth are to be cut from the periphery and cannot be produced by known methods of milling curved teeth.

Figure 17:
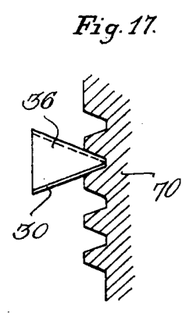
Figures 17–23 diagrammatically illustrate the various operations that the machine is capable of producing.
Figure 18:
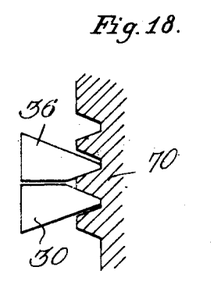
Figure 19:
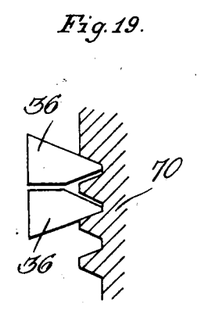
Figure 20:
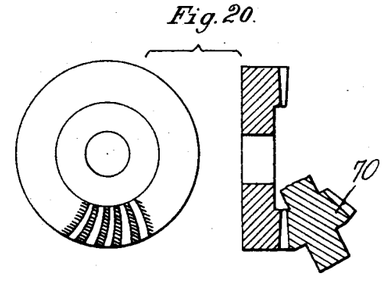
Figure 21:
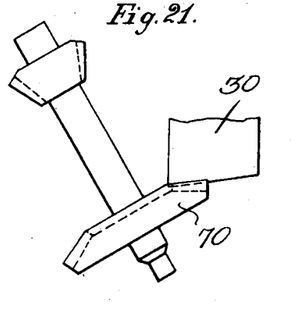
Figure 22:
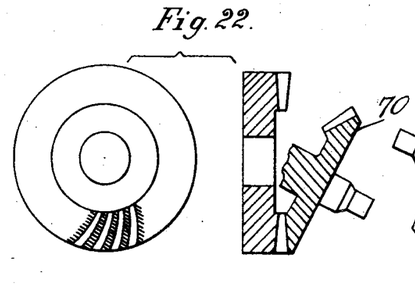
Figure 23:
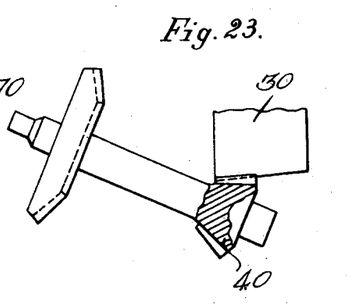

As may be seen from Figs. 17–19 the simultaneous machining of two faces may be effected in various manners. According to Fig. 17 two cutting tools 30 and 36 act in one space on the faces of two adjacent teeth. According to Fig. 18 the faces of one tooth are simultaneously machined by the cutting tools 30 and 36. According to Fig. 19 the faces of two different teeth are machined by the tools 30 and 36, whereby the cutting tools are not situated in the same space.

For the two arrangements according to Figs. 18 and 19 the second constructional arrangement of the tools as illustrated in Figs. 13-16 serves.

The rotation of the bevel wheel 70 (work) about its axis E—E is positive with the rotation of the drum 60.

Figure 12:
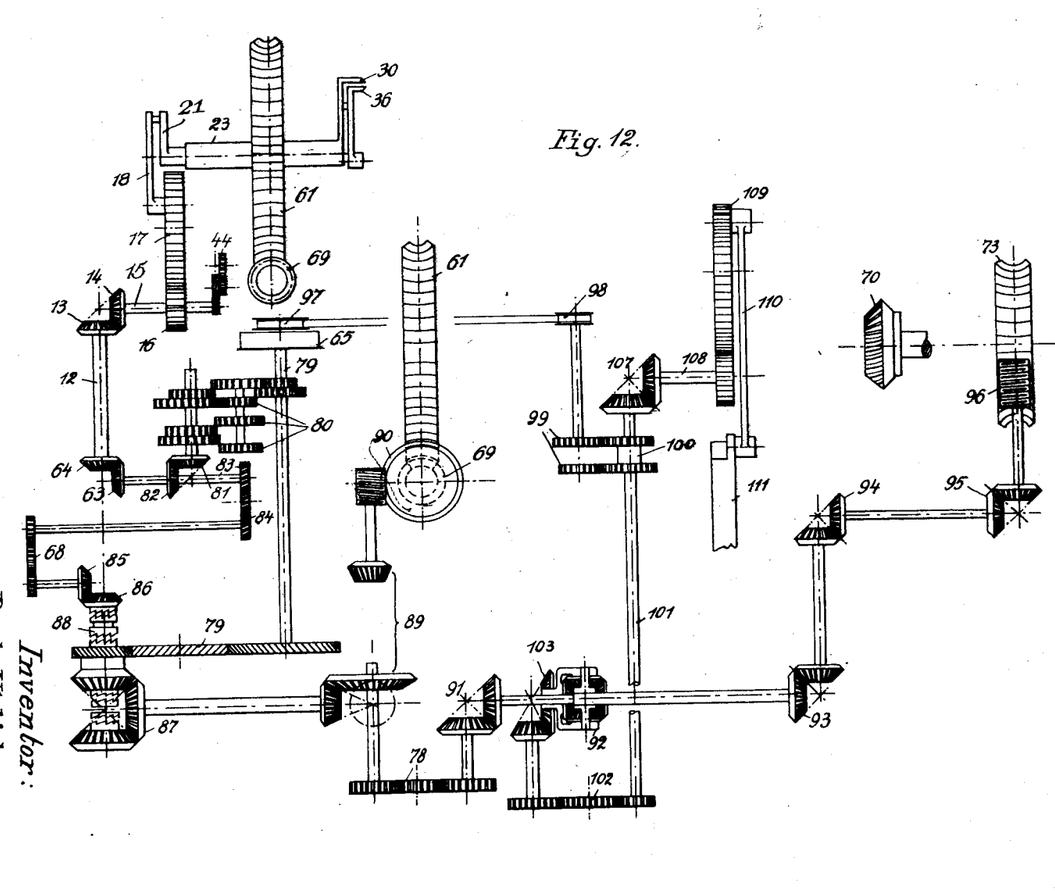
Figure 12 is a diagrammatic view illustrating the relative connection and association of the drive mechanisms.
Figures 13, 14:
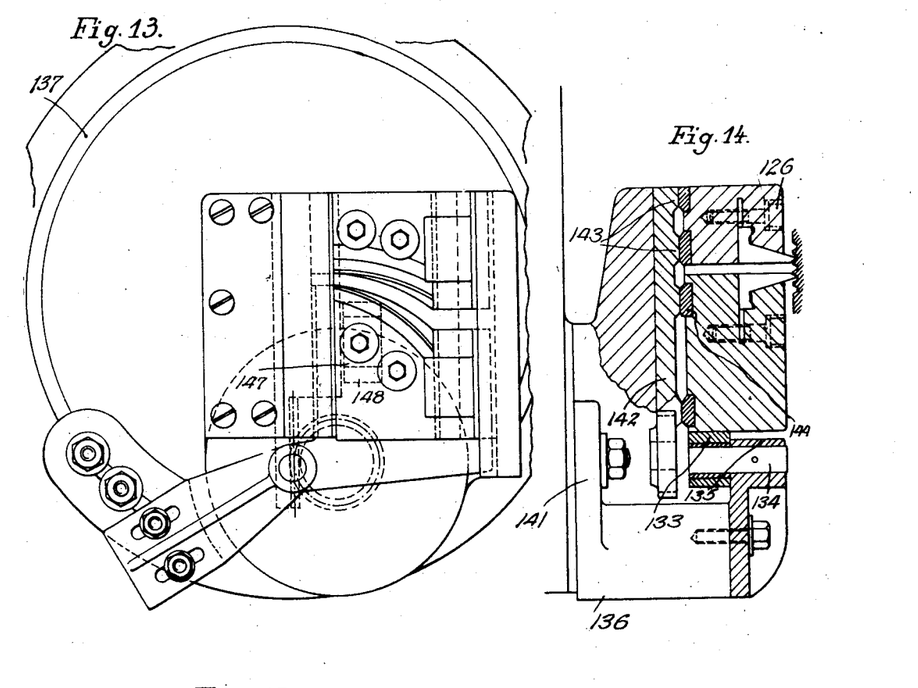
Figures 13, 14, 15 and 16 are detailed views of the head structure and tool carrier.
Figure 15:
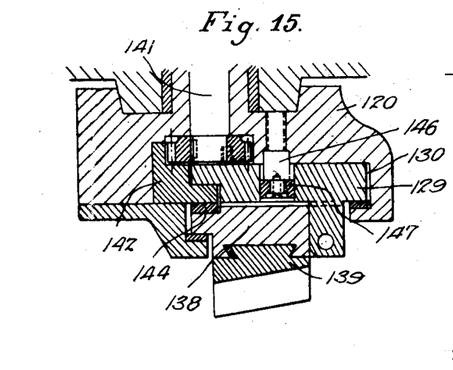

From the diagrammatic illustration in Fig. 12 may be seen the arrangement of the driving gears. The pulley 65 drives—by means of its shaft 79, the change speed gear 80 and the bevel wheels 81, 82 and 63, 64—the shaft 12 at a chosen speed and transmits rotation in above described manner to the shaft 23, thereby causing rocking of the pair of cutting tools. On the other hand the bevel wheel 82 drives—by means of the shaft 83, wheels 84, change wheels 68, bevel wheels 85, 86—a reversing gear 87 which through the clutch 88 may be coupled either with the bevel wheel 86 for effecting the cutting operation, or, through the gear 71' with the quicker rotating shaft 79 for effecting the reversed running of the drum 60 and the work (bevel wheel) 70.

The reversing gear 87 enables alteration in the direction of rotation for the working operation and for the return stroke.

The wheels 89, on the one hand, transmit rotation by means of the worm gear 90, the worm 69 and worm wheel 61 to the drum 60 and, on the other hand, serve for driving the change wheels 78. These latter serve for controlling the gear ratio between the drum 60 and the bevel wheel 70, (return stroke) and for driving, through the bevel wheels 91, a differential gear 92, bevel wheels 93, 94, 95, the worm 96 and worm wheel 73.

Moreover devices are provided whereby the bevel wheel 70 is swung out of engagement with the pair of cutting tools and the indexing is effected.

Figure 8:
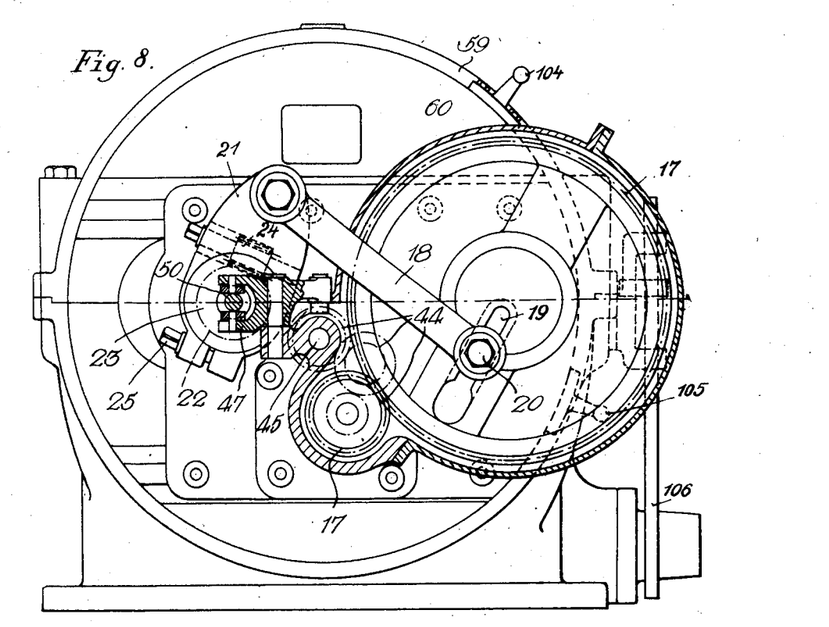
Figure 8 is an end elevation with parts in section.
Figure 9:
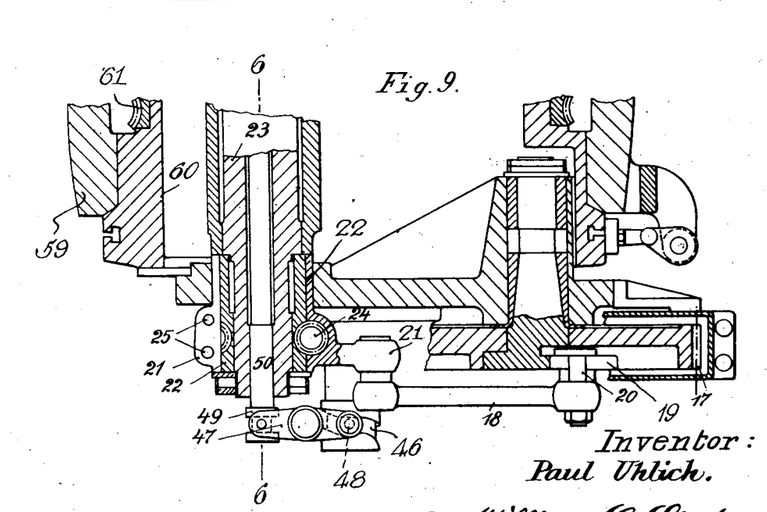
Figure 9 is a horizontal sectional view through one end portion of the machine.

For this purpose the pulley 97, connected with the pulley 65, drives, by means of the pulley 96 and gears 99, the automatic indexing apparatus 100, of known construction, which imparts a periodical movement to the shaft 101. Finally the shaft 101 rotates by means of change wheels 102, bevel wheels 103 and through a differential gear 92, the bevel wheel 70, and moves the latter through an angle of half the pitch or a multiple thereof. The indexing apparatus 100 is released in known manner by a link gear, not shown, which is actuated by the stops 104 and 105 (Fig. 8). The stops 104 and 105 meet at the end of one return stroke of the drum 60 and bevel wheel 70 the rod 106, displace the latter and release by the associated link gear the indexing apparatus 100. The shaft 101 of the indexing apparatus operates, however, also by means of the bevel wheels 107, shaft 108 and spur wheels 109 a pitman 110; the latter swings by means of the segment 111 the base plate 74 around F—F in order to bring—prior to further dividing and prior to the return stroke—the bevel wheel 70 out of reach of the pair of cutting tools.

Figure 26:
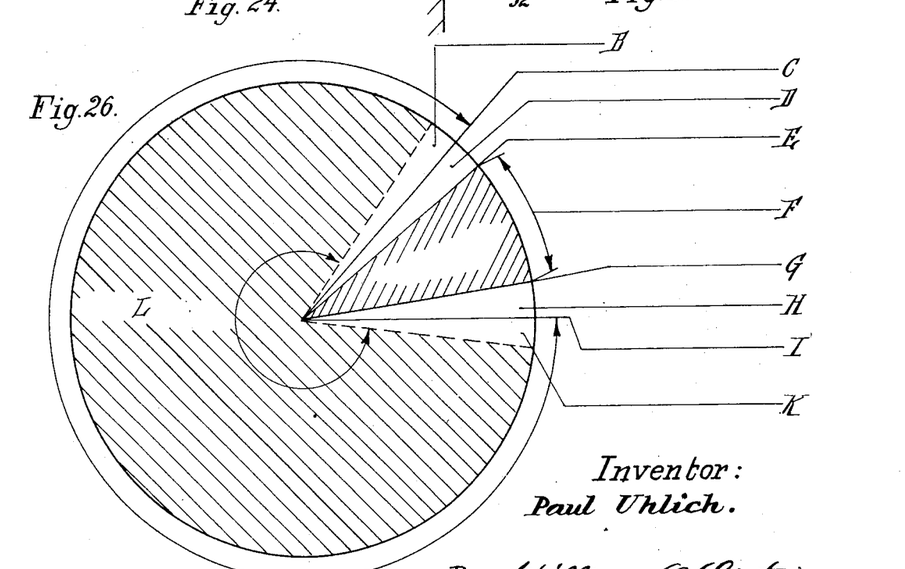
Figure 26 is a diagram illustrating the steps in the accomplishment of the complete operation.

The succession of the movements, apart from the rocking movements of the tools may be seen from the graph shown in Fig. 26, in which:—

A. Represents the forward movement of tool carrier and wheel.
B. Rear over-run.
C. Stop of forward movement.
D. Swinging-out and indexing.
E. Throwing-in for return stroke.
F. Return stroke of tool carrier and wheel.
G. Stop of return stroke.
H. Indexing and swinging-in.
I. Throwing-in for forward movement.
K. Front over-run.
L. Planing.

The succession of the movements is as follows:

1. Forward movement of tool carrier and wheel.
2. Stop of movement 1.
3. Swinging-out of the wheel from the reach of the tools; simultaneous adjustment of the wheel through half a pitch, engagement for return stroke.
4. Return stroke of tool carrier and wheel.
5. Stop of return stroke and adjustment of the wheel through half a pitch, swinging-in of the wheel into reach of the tools.
6. Throwing-in the forward movement.

What I claim is:

1. In a machine of the character described, a frame, a drum mounted in the frame for arcuate movement, a tool head, a base plate adjustably mounted on the drum and supporting said head for arcuate movement, means for giving such arcuate movement to the head, companion tools pivotally connected to the head and one tool further pivotally connected to said plate so that the tools may be swung laterally and further travel in different arcuate paths and control mechanism alternately operating against said tools for alternately swinging the same about their pivots to render the tools operative and inoperative relative to the work.

2. In a machine of the character described, a frame, a drum mounted for arcuate movement in the frame, a tool head mounted for rectilinear adjustment and for arcuate movement in said drum, means for giving arcuate movement to said head, companion tools mounted in the head for rectilinear movements toward and away from each other and for relatively pivoted movement, and control mechanisms alternately operating upon said tools and alternately moving said tools to operative and inoperative position.

3. In a machine of the character described, a frame, a drum mounted in the frame for arcuate movements, a plate connected to the drum for lateral adjustments, a tool head rockably supported by the plate, a shaft for rocking the head having a crank, drive mechanism connected to the crank, a pair of tool holders pivotally and slidably connected to said head, a swinging connection between one of the holders and said plate, cam members giving pivotal movements to said holders to render the tools carried by the holders operative or inoperative, and control mechanism operating in timed relation with said shaft for operating said cam members.

4. In a machine for the manufacture of curved teeth of bevel wheels, a wheel support, a tool holder arranged adjacent said support, a pair of reciprocating cutting tools mounted upon said holder and having their cutting edges arranged at one side of the center of the wheel to be cut and means whereby the tools may be rocked simultaneously about spaced pivotal centers situated upon a common circular line.

5. In a machine for the manufacture of curved teeth of bevel wheels, a work support, a tool holder, a group of reciprocating cutting tools carried by said holder and having their cutting edges arranged at one side of the center of the wheel to be cut, means for mounting said tools upon said holder whereby they may rock about spaced pivotal centers and means for simultaneously rocking said tools.

6. In a machine for the manufacture of curved teeth of bevel wheels, a frame, a rocking head mounted upon said frame, a cutting tool holder mounted upon said rocking head, means for oscillating said holder in said rocking head about the axis of the latter, a second cutting tool holder rotatably mounted adjacent said rocking head, the center of rotation of said second cutting tool holder being spaced relatively to the axis of the first mentioned tool holder, and a work support arranged adjacent said tool holders.

7. In a machine for the manufacture of longitudinally curved tooth gears, a work support, a frame, a pair of tools adapted to cut opposite side tooth faces of the blank pivotally mounted on the frame, and means for simultaneously oscillating said tools about their pivots.

8. In a machine for the manufacture of longitudinally curved tooth gears, a work support, a frame, a pair of tools adapted to cut opposite side tooth faces of the blank pivotally mounted on the frame for movement about centers displaced relative to each other, and means for simultaneously oscillating said tools about their pivots.

9. In a machine for the manufacture of longitudinally curved tooth gears, a work support, a frame, a pair of tools adapted to cut opposite side tooth faces of the blank pivotally mounted on the frame for movement about centers displaced relative to each other and situated upon a circle concentric with the apex of the gear to be cut, and means for simultaneously oscillating said tools about their pivots.

10. In a machine for the manufacture of longitudinally curved tooth gears, a work support, a frame, a pair of tools adapted to cut opposite side tooth faces of the blank pivotally mounted on the frame for a movement about centers displaced relative to each other, means for adjusting the center about which one tool moves relative to that about which the other moves, and means for simultaneously oscillating said tools about said centers.

11. In a machine for the manufacture of longitudinally curved tooth gears, a work support, a frame, a pair of tools adapted to cut opposite side tooth faces of the blank pivotally mounted on the frame, means for simultaneously oscillating said tools about their pivots and means for alternately moving the tools into cutting position.

12. In a machine for the manufacture of longitudinally curved tooth gears, a work head, a tool head, an oscillatable drum upon which one of said heads is mounted, a work spindle journaled in the work head, a pair of tool holders mounted for pivotal movement about centers displaced relative to each other and situated upon a circle concentric with the axis of said drum, one of said tool holders being journaled in the tool head, tools secured to said holders for cutting, respectively, opposite side tooth faces of the blank, means for actuating the drum and work spindle, and means for simultaneously oscillating said tools about their respective pivots.

13. In a machine for the manufacture of longitudinally curved tooth gears, a work support, a frame, a pair of tool holders pivotally mounted on the frame, tools secured to said holders adapted, respectively, to cut opposite side tooth faces of the blank, means for rocking one of said tool holders about its pivot and means connecting the other tool holder to the first whereby the rocking of one tool causes the rocking of the other also.

14. In a machine for the manufacture of longitudinally curved tooth gears, a work holder, an oscillatable drum, a tool holder eccentrically journaled in said drum, a second tool holder journaled in said drum, means for rocking the first tool holder about its axis, means connecting the first tool holder with the second whereby oscillation of the first is transmitted to the second, and means for simultaneously oscillating said drum and work holder.

15. In a machine for the manufacture of longitudinally curved tooth gears, a frame, a pair of movable tool holders mounted on said frame, one of said tool holders being pivotally mounted thereon, means constraining the other tool holder in its movement so that the tool carried thereby will move in a curved path across the face of the gear blank, tools mounted on said support adapted, respectively, to cut opposite side tooth faces of the blank, a blank support, means for positioning the tool and blank supports in operative relation, and means for simultaneously oscillating said tools.

16. In a machine for the manufacture of longitudinally curved tooth gears, a frame, a pair of movable tool holders mounted on said frame, for movement about centers displaced relative to each other, one of said tool holders being pivotally mounted on the frame, means constraining the other tool holder in its movement so that the tool carried thereby will move in a longitudinally curved path across the face of the gear blank, tools secured to said holders adapted, respectively, to cut opposite side tooth faces of the blank, a blank support, means for positioning the tool and blank support in operative relation and means for simultaneously oscillating said tool holders.

17. In a machine for the manufacture of gears, a frame, a tool holder pivotally mounted on the frame, and a member slidable in said frame having a cam surface adapted to engage said tool holder to move said tool holder about its pivot to swing the holder to and from cutting position.

18. In a machine for the manufacture of longitudinally curved tooth gears, a frame, a pair of tool holders pivotally mounted on the frame, said frame having a guide way formed therein in the rear of said tool holder and a member slidable in said guide way having a cam surface formed on its front face adapted to engage said holders to move them alternately about their respective pivots to bring the tools alternately into cutting position.

In testimony whereof I affix my signature.

PAUL UHLICH.